United States Patent
Cheng et al.

(10) Patent No.: US 7,535,876 B2
(45) Date of Patent: May 19, 2009

(54) METHOD OF FLOW CONTROL FOR HSDPA AND HSUPA

(75) Inventors: Fang-Chen Cheng, Randolph, NJ (US); Teck H. Hu, Budd Lake, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1085 days.

(21) Appl. No.: 10/404,187

(22) Filed: Apr. 1, 2003

(65) Prior Publication Data

US 2004/0196870 A1 Oct. 7, 2004

(51) Int. Cl.
- H04J 3/00 (2006.01)
- H04B 7/216 (2006.01)
- H04L 12/28 (2006.01)
- H04L 12/56 (2006.01)
- H04J 3/16 (2006.01)
- H04J 3/22 (2006.01)

(52) U.S. Cl. ............ 370/336; 370/337; 370/347; 370/395.4; 370/470

(58) Field of Classification Search .......... 370/470, 370/467, 493, 496, 336, 236.1, 231, 347, 370/310.1, 310.2, 352, 395.1, 395.4, 395.41, 370/395.21, 395.52

See application file for complete search history.

(56) References Cited

U.S. PATENT DOCUMENTS

| | | | | |
|---|---|---|---|---|
| 6,400,699 | B1 | 6/2002 | Airy et al. | 370/329 |
| 6,445,696 | B1 * | 9/2002 | Foodeei et al. | 370/356 |
| 2001/0021180 | A1 | 9/2001 | Lee et al. | 370/336 |
| 2003/0031119 | A1 * | 2/2003 | Kim et al. | 370/200 |
| 2003/0039230 | A1 | 2/2003 | Ostman et al. | 370/335 |
| 2003/0101274 | A1 | 5/2003 | Yi et al. | 709/232 |
| 2003/0128707 | A1 * | 7/2003 | Kalkunte et al. | 370/395.41 |
| 2003/0133408 | A1 * | 7/2003 | Cheng et al. | 370/230 |
| 2003/0207696 | A1 * | 11/2003 | Willenegger et al. | 455/522 |
| 2004/0018846 | A1 * | 1/2004 | Cheng et al. | 455/458 |

(Continued)

FOREIGN PATENT DOCUMENTS

EP 1 248 485 10/2002

(Continued)

OTHER PUBLICATIONS

"3rd Generation Partnership Project; Technical Specification Group Radio Access Network; High Speed Downlink Packet Access; Overall UTRAN Description (Release 5)," *3GPP TR 25.855 V1.0.0*, (Jun. 2001), pp. 1-26.

(Continued)

*Primary Examiner*—Chi H Pham
*Assistant Examiner*—Farah Faroul

(57) ABSTRACT

A method of communication, generally, and more particularly, a method of wireless communication. The method includes the step of receiving at least data over a signaling interface. The received data may be received, for example, by a base station or base station controller. The method also includes the step of transmitting the data within a scheduling received data may also be characterized as having a frame size. The interval. The base station or base station controller, for example, may perform the step of transmitting the data. The frame size of the data received by the base station and/or base station controller may at most correspond with the scheduling interval such that frame size of the data may be less than or equal to the scheduling interval.

25 Claims, 2 Drawing Sheets

U.S. PATENT DOCUMENTS

2005/0193309 A1* 9/2005 Grilli et al. ............... 714/752

FOREIGN PATENT DOCUMENTS

| EP | 1 289 219 | 3/2003 |
|---|---|---|
| WO | WO 03/019960 | 3/2003 |

OTHER PUBLICATIONS

Lucent Technologies, "Text Proposal for the HSDPA Technical Report," *TSGR1#17(00)1384*, (Nov. 21, 2000), pp. 1-9.

Lucent Technologies, "Downlink and Uplink Channel Structures for HSDPA," *TSGR1#17(00)1381*, (Nov. 21, 2000), pp. 1-7.

"3rd Generation Partnership Project; Technical Specification Group Radio Access Network; High Speed Downlink Packet Access: lub/lur protocol aspects (Release 5)," *3GPP TR 25.877 V5.1.0*, (Jun. 2002), pp. 1-49.

European Search Report.

* cited by examiner

METHOD OF FLOW CONTROL FOR HSDPA AND HSUPA

FIELD OF THE INVENTION

This invention relates to telecommunications and, more particularly, to wireless communications.

BACKGROUND OF THE INVENTION

Wireless communications systems employ a number of geographically distributed, cellular communication sites or base stations. Each base station supports the transmission and reception of communication signals to and from stationary or fixed, wireless communication devices or units. Each base station handles communications over a particular region commonly referred to as a cell/sector. The overall coverage area for a wireless communications system is defined by the union of cells for the deployed base stations. Here, the coverage areas for adjacent or nearby cell sites may overlap one another to ensure, where possible, contiguous communications coverage within the outer boundaries of the system.

When active, a wireless unit receives signals from at least one base station over a forward link or downlink and transmits signals to at least one base station over a reverse link or uplink. Several approaches have been developed for defining links or channels in a cellular communication system. These schemes include, for example, TDMA (time-division multiple access), and CDMA (code-division multiple access).

In TDMA communication systems, the radio spectrum is divided into time slots. Each time slot allows only one user to transmit and/or receive. Thusly, TDMA requires precise timing between the transmitter and receiver so that each user may transmit their information during their allocated time.

In CDMA communications systems, different wireless channels are distinguished by different channelization codes or sequences. These distinct channelization codes are used to encode different information streams, which may then be modulated at one or more different carrier frequencies for simultaneous transmission. A receiver may recover a particular stream from a received signal using the appropriate code or sequence to decode the received signal.

Referring to FIG. 1, an exemplary network 10 supportive of wireless communications is illustrated. Here, network 10 may accommodate one of a number of standard architectures, including the Universal Mobile Telecommunications System ("UMTS") and/or Code Division Multiple Access ("CDMA") systems, for example. Network 10 may be divided into a radio access network ("RAN") 12 and a core network 14. RAN 12 includes equipment used to support wireless interfaces 16a and 16b between exemplary wireless units, 18a and 18b, and network 10. RAN 12 also comprises a plurality of Node Bs or base stations 20a through 20c, as well as a number of radio network controllers ("RNCs") or base station controllers, 22a and 22b. The signaling exchange between the Node Bs and RNCs is commonly referred to as the $I_{ub}$ interface, while the interface between RNCs themselves is commonly referred to as the $I_{ur}$ interface. The transport mechanism of both the $I_{ub}$ and $I_{ur}$ interfaces is generally based on asynchronous transfer mode ("ATM").

Core network 14 includes network elements that support circuit based communications, as well as packet-based communications. In establishing a circuit channel to handle circuit-based communications between the wireless unit 18b and a public switched telephone network ("PSTN") 24 or another wireless unit, for example, base station 20b may receive (in the uplink) and transmits (in the downlink) coded information (e.g., circuit voice or circuit switched data) over the wireless interface or link 16b. RNCs 22a and 22b may each perform a number of functions, including frame selection, encryption, and handling of access network mobility, for example. In the above scenario, RNC 22b may forward the circuit voice and circuit switched data over a network, such as an asynchronous transfer mode ("ATM")/Internet Protocol ("IP") network 28 to a mobile switching center ("MSC") 30. MSC 30 is responsible for call processing and macromobility on the MSC level. MSC 30 establishes the connectivity between wireless unit 18b, for example, and PSTN 24.

In establishing a packet channel to handle packet-based communications between exemplary wireless unit 18a and a packet data network ("PDN") 34, such as the Internet, base station 20a receives (in the uplink) and transmits (in the downlink), coded information over the wireless interface or link 16a. In the uplink direction, RNC 22a reassembles the packets as sent by exemplary wireless unit 18a and forwards them to a serving GPRS (e.g., General Packet Radio Service) support node ("SGSN") 40. In the downlink direction, RNC 22a receives the packets and segments them into the right size packet to be transferred to the base station, which may perform its processing and the data across the wireless link 16a. SGSN 40 provides packet data session processing and macromobility support for network 10. SGSN 40 establishes connectivity between wireless unit 18a and PDN 34.

Additionally, core network 14 may also include a gateway GPRS support node ("GGSN") 42. GGSN 42 may act as the gateway to external PDNs, for example. Upon requests from SGSN 40, GGSN provides a gateway for packet data protocol ("PDP") session establishment.

For voice applications, conventional cellular communication systems employ dedicated links between a wireless unit and a base station. Voice communications are delay-intolerant by nature. Consequently, wireless units in wireless cellular communication systems transmit and receive signals over one or more dedicated links. Each active wireless unit generally requires the assignment of a dedicated link on the downlink, as well as a dedicated link on the uplink.

With the explosion of the Internet and the increasing demand for data, resource management has become a growing issue in cellular communication systems. Next generation wireless communication systems, such as those employing High Speed Downlink Packet Access ("HSDPA") and High Speed Uplink Packet Access ("HSUPA"), are expected to provide premium data services in support of Internet access and multimedia communication. Unlike voice, however, data communications may be potentially bursty yet relatively delay tolerant. The system for data communications, as such, may not be efficient with dedicated links on the downlink or the uplink. A more efficient data communication system may be enabled if the system employs one or more channels to be shared by a number of wireless units. By this arrangement, each of the wireless units on the downlink shares available resources, where the downlink transmission is scheduled to the user(s) through a resource management process. Resources to be managed in the downlink include, for example, the allocated transmit power by the Node B, the channelization codes, and/or the interference created by each user to other users in the same sector or cell, as well as in other sectors or cells.

The general management of resources at a Node B offering HSDPA/HSUPA services may be performed by a radio network controller, such as RNC 22a and/or RNC 22b in FIG. 1. For example, each RNC may determine and control various characteristics in the transfer of data on the downlink and/or uplink for each Node B supporting HSDPA/HSUPA services.

These characteristics on the downlink and/or uplink may include, for example, the allocation of transmit power and/or the transmission speed of the data packets.

Various problems have been identified in the further development of HSDPA/HSUPA services. These problems include, for example, inefficiency and performance issues in the transfer of data, as well as design implementation costs of base stations supporting HSDPA/HSUPA services. Consequently, a demand exists for a method for increasing the efficiency and performance of a network supporting HSDPA/HSUPA services. Moreover, a need exists for reducing the costs of implementing a base station supporting HSDPA/HSUPA services.

SUMMARY OF THE INVENTION

The present invention provides a method of communication. More particularly, the present invention provides a method of wireless communication supporting the transmission and reception of data on the downlink and/or uplink, such as HSDPA and HSUPA, for example, by causing a frame size of the data transmitted over the signaling interface to correspond at most with a scheduling interval of the data packets transmitted to wireless units. In so doing, the present invention addresses the efficiency and performance of a network supporting HSDPA/HSUPA services, as well as the costs associated with the in implementation of a base station supporting HSDPA/HSUPA services.

In one embodiment of the present invention, a method of communication comprises the step of receiving information having data and a frame size over a signaling interface. The signaling interface may be, for example, the $I_{ub}$ and/or the $I_{ur}$ interfaces. Consequently, the information may be received by a base station (s) and/or a base station controller(s). The method also comprises the step of transmitting the data within a scheduling interval. For example, the base station(s) and/or base station controller(s) may perform the step of transmitting the data. The frame size of the data received by the station(s) and/or base station controller(s) over the signaling interface may at most correspond with the scheduling interval. As such, the frame size of the data may be less than or equal to the scheduling interval.

In another embodiment of the present invention, a method communication comprises the step of transmitting data having a frame size for retransmission within a scheduling interval. The data may be originally transmitted over a signaling interface, such as the $I_{ub}$ and/or the $I_{ur}$ interfaces, for example. The method also comprises the step of transmitting protocol information over the signaling interface. At least some of the protocol information transmitted may be associated with the data. The frame size of the data transmitted over the signaling interface may at most correspond with the scheduling interval of the retransmission. As such, the frame size of the data may be less than or equal to the scheduling interval.

In yet another embodiment of the present invention, a method of communication using a controller, which may communicate data having a frame size and protocol information to a base station over a signaling interface. The method comprises the step of transmitting and/or receiving data within a scheduling interval. The frame size of the data communicated over the signaling interface may at most correspond with the scheduling interval. As such, the frame size of the data may be less than or equal to the scheduling interval.

BRIEF DESCRIPTION OF THE DRAWINGS

The present invention will be better understood from reading the following description of non-limiting embodiments, with reference to the attached drawings, wherein below.

It should be emphasized that the drawings of the instant application are not to scale but are merely schematic representations, and thus are not intended to portray the specific dimensions of the invention, which may be determined by skilled artisans through examination of the disclosure herein.

DETAILED DESCRIPTION

The present invention provides a method of communication. More particularly, the present invention provides a method of wireless communication supporting the transmission and reception of data on the downlink and/or uplink, such as HSDPA and HSUPA, for example. In so doing, the present invention addresses the efficiency and performance of a network supporting HSDPA/HSUPA services, as well as the costs associated with the in implementation of a base station supporting HSDPA/HSUPA services.

Networks supporting data communication services, such as HSDPA and HSUPA, for example, may suffer from performance shortcomings. These limitations may be attributed to a flow lag between the transfer of data over the signaling interface $I_{ub}$ and from a base station to one ore more designated wireless units. In a base station supporting HSDPA services, for example, data having a frame size may be transferred from the base station controller to the base station over the $I_{ub}$ signaling interface. Thereafter, the transferred data may be packetized and retransmitted within a scheduling interval to wireless units seeking HSDPA service, for example. Networks, however, presently support a frame size for the data that may be appreciably longer (e.g., a multiple thereof) than the scheduling interval. As a result, a time lag may exist between the transmission of data over the signaling interface $I_{ub}$ and the transmission of corresponding data packets from the base station to the wireless unit.

To facilitate and maintain the data flow in view of the potential time lag, network designs support the incorporation of a memory buffer embedded in one or more application specific integrated circuits ("ASICs") used in the base station. More particularly, data received from a base station controller may be stored within a sufficiently sized buffer memory to satisfy each of the wireless units seeking HSDPA services, for example. In this scenario, the size of the buffer memory may compensate for the aforementioned time lag. However, the cost of incorporating increasing sizeable memory within an ASIC may grow disproportionately with more and more demand for HSDPA or HSUPA services. Consequently, the practicality of ever increasing the buffer memory to compensate for time lag may reach its limitations. In view of these performance issues, the present invention provides for a method of supporting the transmission and reception of data on the downlink and/or uplink by causing the frame size of the data transmitted over the signaling interface to correspond at most with the scheduling interval of the data packets transmitted to wireless units.

Figure 1:
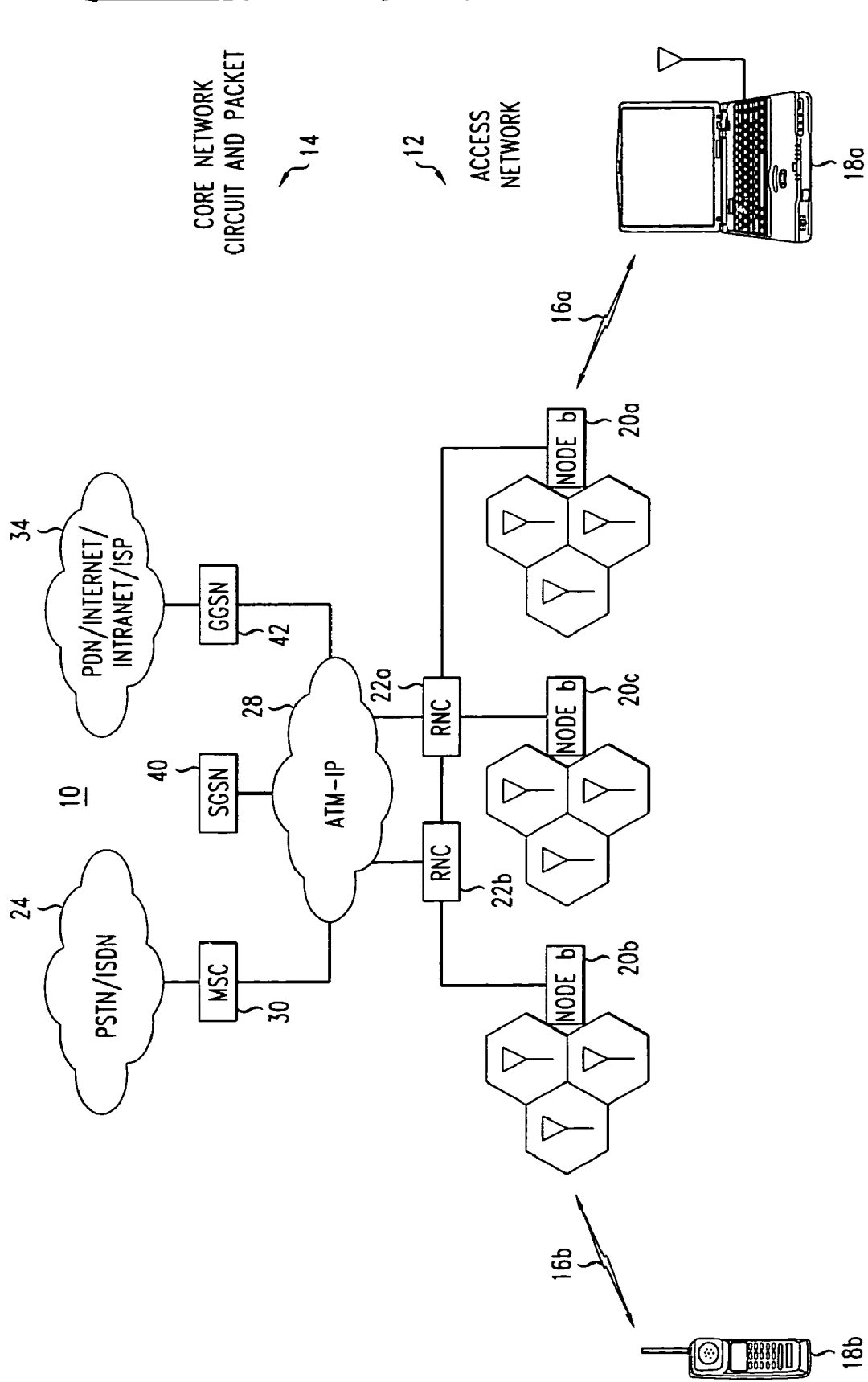
FIG. 1 depicts a block diagram of a typical network architecture.
Figure 2:
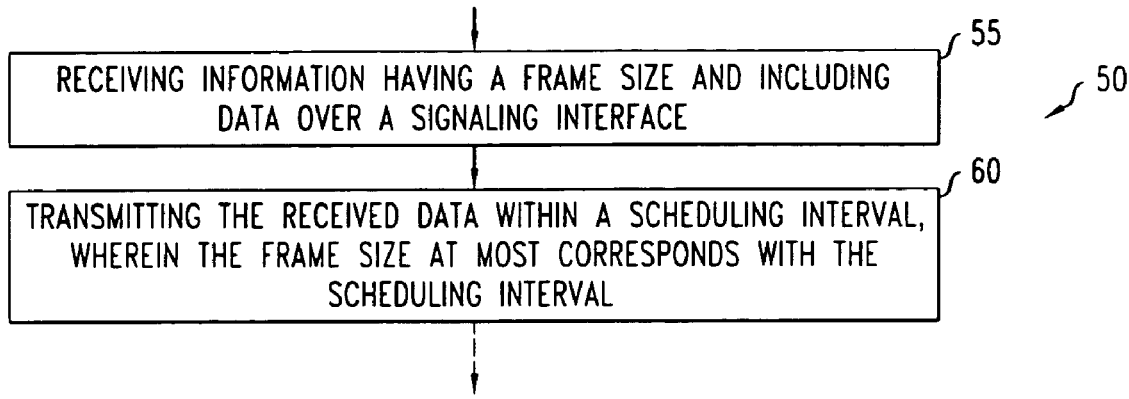
FIG. 2 depicts an embodiment of the present invention.

Referring to FIG. 2, a flow chart 50 of an embodiment of the present invention is illustrated. Here, a method of communication is depicted that reflects the steps that may be carried out within a base station, for example, supporting various downlink and/or uplink data services, such as HSDPA and/or HSUPA. The method of shown in flow chart 50 includes the step of receiving information over a signaling interface 55. The information received comprises data having a frame size. Moreover, the signaling interface may be, for example, the $I_{ub}$ and/or the $I_{ur}$ interfaces. Consequently, the information may be received by a base station(s) and/or a base station controller(s).

It should be noted that the received information might also comprise protocol information along with the data. In one example, at least some of the protocol information may be associated with the aforementioned data. The protocol information received may include at least one of the following: power flow control, a MAC-d flow, a size for the data to be received, association information at least of the portion of the data with at least one user, a size for the data to be transmitted, a transmission speed of the data to be received, a transmission speed of the data to be transmitted, an initial time for the data to begin being received, an initial time for the data to begin being transmitted, a power level of the data to be received, and a power level of the data to be transmitted.

The method also comprises the step of transmitting the data within a scheduling interval 60. For example, the base station(s) and/or base station controller(s) may perform the step of transmitting the data. The frame size of the data received by the base station(s) and/or base station controller(s) over the signaling interface may at most correspond with the scheduling interval. As such, the frame size of the data may be less than or equal to the scheduling interval.

To support wireless downlink and/or uplink data services, the received data as transmitted may be in a packet format. As such, the data may be packetized by the receiving entity (e.g., base station and/or base station controller) before performing the step of transmitting the data within a scheduling interval 60. Here, the received data may be stored in a buffer prior to and/or after performing the step of packetizing. Moreover, the received data may also be stored in accordance with each user requesting the at least one of a wireless downlink data service and a wireless uplink data service.

Figure 3:
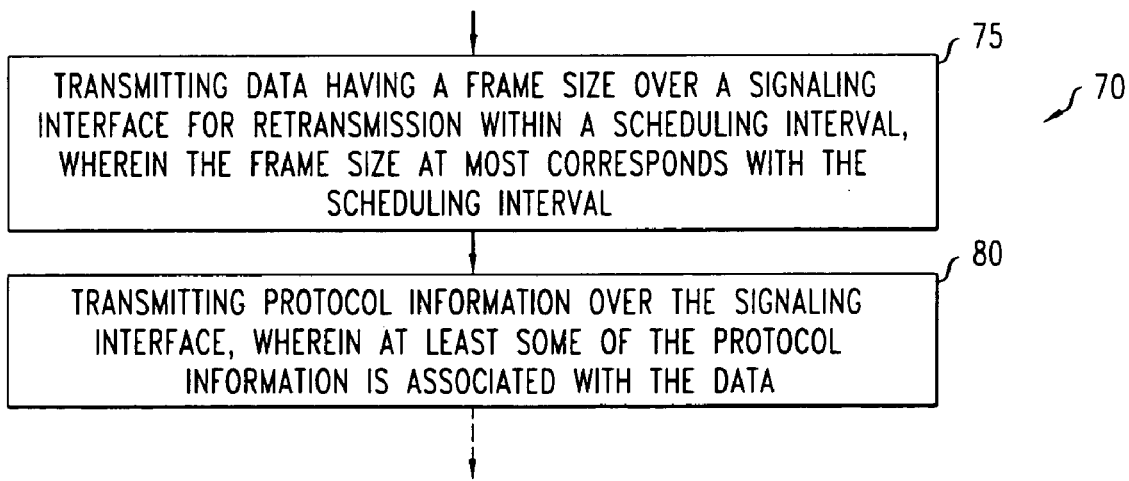
FIG. 3 depicts another embodiment of the present invention.

Referring to FIG. 3, a flow chart 70 of another embodiment of the present invention is illustrated. Here, a method of communication is depicted that reflects the steps that may be carried out within a base station controller, for example, supporting various downlink and/or uplink data services, such as HSDPA and/or HSUPA. The method of shown in flow chart 70 includes the step of transmitting data having a frame size over a signaling interface for retransmission within a scheduling interval 75. The signaling interface may be, for example, the $I_{ub}$ and/or the $I_{ur}$ interfaces.

Consequently, the data transmitted by step 75 may be received, for example, by a base station(s) and/or another base station controller(s) for subsequent retransmission. This subsequent retransmission of the data may also include the step of packetizing the transmitted data, as received, prior to retransmission, for example. The frame size of the transmitted data, packetized or otherwise, may at most correspond with the scheduling interval. As such, the frame size of the data may be less than or equal to the scheduling interval.

The method depicted in flow chart 70 also comprises the step of transmitting protocol information over the signaling interface 80. The transmission of the protocol information may occur along with the transmission of data in step 75. In one example, at least some of the protocol information may be associated with the aforementioned data. The protocol information received may include at least one of the following: power flow control, a MAC-d flow, a size for the data to be received, association information at least of the portion of the data with at least one user, a size for the data to be transmitted, a transmission speed of the data to be received, a transmission speed of the data to be transmitted, an initial time for the data to begin being received, an initial time for the data to begin being transmitted, a power level of the data to be received, and a power level of the data to be transmitted.

Figure 4:
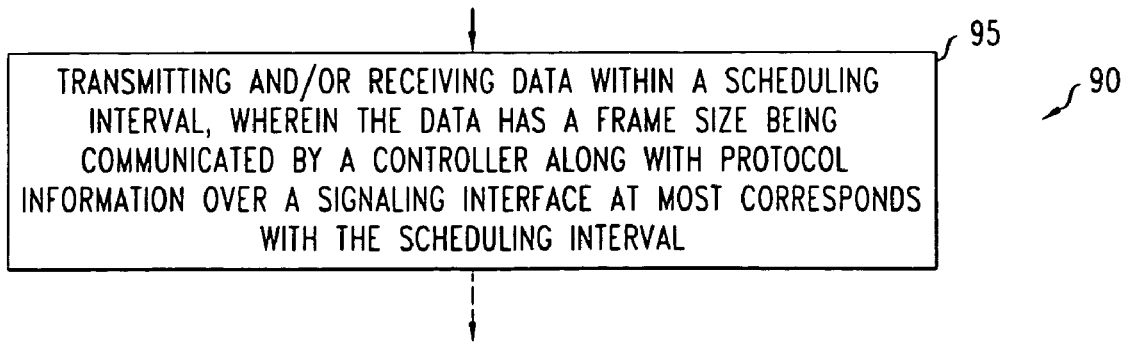
FIG. 4 depicts another embodiment of the present invention.

Referring to FIG. 4, a flow chart 90 of yet another embodiment of the present invention is illustrated. Here, a method of communication is depicted that reflects the steps that may be carried out within a wireless unit, for example, supporting various downlink and/or uplink data services, such as HSDPA and/or HSUPA. The method of shown in flow chart 90 employs a base station controller, which may communicate data having a frame size and protocol information to a base station over a signaling interface, such as, for example, the $I_{ub}$ and/or the $I_{ur}$ interfaces. More particularly, the method includes the step of transmitting and/or receiving data within a scheduling interval 95. The frame size of the data communicated over the signaling interface may at most correspond with the scheduling interval. As such, the frame size of the data may be less than or equal to the scheduling interval.

Exemplary System

In networks supporting HSDPA and HSUPA services, a Frame Protocol ("FP") may employed in conjunction with a designated channel (e.g., HS-DSCH) to handle the data transport between the core RNC ("CRNC") and the Node B over the $I_{ub}$ signaling interface, as well as between the service RNC ("SRNC") and the CRNC over the $I_{ur}$ signaling interface. Over the $I_{ub}$ interface, the logical flow from the medium access control ("MAC") entity for shared channels, such as HS-DSCH channels, may be transported from the CRNC to the Node B into the new MAC entity residing in the Node B for HSDPA (e.g., MAC-hs) using the data frame of the designated channel, such as the HS-DSCH, for example. This data frame may be sent from the CRNC to the Node B every transmission time interval ("TTI"). In the Node B, the new entity called MAC-hs may be defined for the designated channel, such as the HS-DSCH, for example. The MAC-hs may perform various duties including scheduling, HARQ operations, and/or priority handling of the data received over the $I_{ub}$ signaling interface.

In certain applications, it may be important for the $I_{ub}$ signaling interface to reflect the MAC model (e.g., MAC-hs) in the Node B. For example, the TTI may be defined in MAC-hs to allow for the scheduling of data to a wireless unit every of 2 milliseconds (e.g., every TTI). To support a TTI of 2 milliseconds, for example, the frame protocol for the channel, such as the HS-DSCH, should transport channel "TTI" designated at 2 milliseconds. The frame protocols, $I_{ub}$ NBAP signaling, and $I_{ur}$ RNSAP signaling (e.g., the open interface between Drift RNC and Controlling RNC, or, in other words, between RNCs) may not specify the TTI of the frame protocol for the exemplary channel, such as the HS-DSCH. However, the HS-DSCH interval IE in the HS-DSCH Capacity Allocation Control frame, for example, may have a granularity of 10 milliseconds. It might be apparent that the data frame found in the exemplary HS-DSCH might still employ the TTI based on multiple of a longer TTI of 10 milliseconds.

If the FP for the HS-DSCH might be interpreted to have a TTI with length of a multiple of 10 milliseconds based on the 10 milliseconds granularity of the HS-DSCH Interval IE in the HS-DSCH Capacity Allocation, a number of situations may arise. In one scenario, a wireless unit user may have a very good channel condition and be scheduled for transmission continuously using very high data rate from the Node B (e.g., base station). Large amount of data can be sent with maximum data rate to the wireless unit (e.g., user equipment or "UE") and the Node B could be in a situation where it waits for additional data at the end of the 2 milliseconds of the TTI. Due to the mismatch $I_{ub}$ and the air interface (e.g., Uu or the interface between the base station and the wireless unit or UE) TTI, additional data may arrive at the Node B every 10 millisecond interval—e.g., the HS-DSCH Interval. Thus, the scheduler at the Node B may wait for 8 ms before having additional data to schedule again, in this example. In another scenario, bursty traffic source could cause data to arrive at the RNC very sporadically in a light to moderately loaded cell with few users. In the later scenario, a 2 millisecond TTI may allow the flow control of the HS-DSCH FP to react quickly to the data arrival in one UE, and as a result data from other UEs can be sent through the $I_{ub}$ with less delay as well. In both of the above outlined scenarios, the results may be under-utilization of the system resources and potential loss in HSDPA/HSUPA throughput performance.

HS-DSCH $I_{ub}$ Data Frame of 2 Milliseconds

As noted hereinabove, an HSDPA Interval of 2 milliseconds in the HS-DSCH may be used for the HS-DSCH, where the users' data may be scheduled at a faster TTI at the Node B to respond to variations of the channel. This shorter TTI of 2 milliseconds may allow for users to be selected based on their channel condition. As a result, throughput performance may be increased.

Faster Data Transfer Adaptation to Node B

The flow control may be able to react and respond to the speed of the scheduler. For example, if the scheduler time granularity is 2 ms, the flow control may have the same granularity as well. In light of the need to flow control data with different priorities, with shorter flow control granularity of 2 milliseconds, the RNC may be able to quickly switch to send higher priority data to the Node B.

The varying channel condition may be tracked at the Node B, which may then react by scheduling the user(s) with the most desirable channel condition by taking other constraints, such as delay requirements, for example, into account. Therefore, the amount of data to be sent to a particular user may be fast varying as well. It may be the task of the flow control to: (1) guard against the overflow of data in the Node B buffer; and (2) insure that there is sufficient data for scheduling if the channel condition becomes favorable.

Minimize Buffer Provisioning at the Node B

A shorter data frame in flowing rate from the $I_{ub}$ data frame inline with the out flowing scheduling rate may facilitate "just in time" delivery of data into the Node B. This may be realized without the need to buffer too much data at the Node B. Consequently, buffer allocation may be thus saved at the Node B.

Based on the potential loss of performance, the HS-DSCH Interval of the $I_{ub}$ and $I_{ur}$ HS-DSCH FP may be changed so that it is in agreement with the HS-DSCH TTI of 2 milliseconds. If so, the "HS-DSCH Interval" IE may require changes in the "HS-DSCH Capacity Allocation" control message in the $I_{ub}/I_{ur}$ FP as well.

While the particular invention has been described with reference to illustrative embodiments, this description is not meant to be construed in a limiting sense. It is understood that although the present invention has been described, various modifications of the illustrative embodiments, as well as additional embodiments of the invention, will be apparent to one of ordinary skill in the art upon reference to this description without departing from the spirit of the invention, as recited in the claims appended hereto. Consequently, the method, system and portions thereof and of the described method and system may be implemented in different locations, such as network elements, the wireless unit, the base station, a base station controller, a mobile switching center and/or a radar system. Moreover, processing circuitry required to implement and use the described system may be implemented in application specific integrated circuits, software-driven processing circuitry, firmware, programmable logic devices, hardware, discrete components or arrangements of the above components as would be understood by one of ordinary skill in the art with the benefit of this disclosure. Those skilled in the art will readily recognize that these and various other modifications, arrangements and methods can be made to the present invention without strictly following the exemplary applications illustrated and described herein and without departing from the spirit and scope of the present invention. It is therefore contemplated that the appended claims will cover any such modifications or embodiments falling within the true scope of the invention.

The invention claimed is:

1. A method of communication comprising:
   receiving information at a base station over a signaling interface from a network controller,
   the information comprising data and having a frame size that is selected to fit within a scheduling interval used for transmission from the base station over a link that is distinct from the signaling interface; and
   transmitting the data from the base station over the link to a remote station within the scheduling interval.

2. The method of claim 1, wherein the scheduling interval is at least equal to a time length of the frame size.

3. The method of claim 2, wherein the received information comprises protocol information, at least some of the protocol information associated with the data.

4. The method of claim 3, wherein the protocol information comprises at least one of a power flow control, a MAC-d flow, a size for the data to be received, association information at least of the portion of the data with at least one user, a size for the data to be transmitted, a transmission speed of the data to be received, a transmission speed of the data to be transmitted, an initial time for the data to begin being received, an initial time for the data to begin being transmitted, a power level of the data to be received, and a power level of the data to be transmitted.

5. The method of claim 2, wherein the data comprises data packets.

6. The method of claim 5, wherein the data packets support at least one of a wireless downlink data service and a wireless uplink data service.

7. The method of claim 5, comprising:
   storing the data in a buffer; and
   packetizing the data.

8. The method of claim 7, wherein storing the data comprises storing the data in accordance with each user requesting the at least one of a wireless downlink data service and a wireless uplink data service.

9. The method of claim 1, wherein the link comprises a wireless link between the base station and a mobile station and the signaling interface is for communication between the base station and a the network controller.

10. A method of communication comprising:
transmitting data to a base station over a signaling interface from a network controller for retransmission from the base station over a link distinct from the signaling interface within a scheduling interval, the data having a frame size that at most corresponds with the scheduling interval; and
transmitting protocol information to the base station over the signaling interface from the network controller, at least some of the protocol information associated with the data.

11. The method of claim 10, wherein the scheduling interval is at least equal to a time length of the frame size.

12. The method of claim 10, wherein the protocol information comprises at least one of a power flow control, a MAC-d flow, a size for the data to be transmitted, association information at least of the portion of the data with at least one user, a size for the data to be retransmitted, a transmission speed of the data to be transmitted, a transmission speed of the data to be retransmitted, an initial time for the data to begin being transmitted, an initial time for the data to begin being retransmitted, a power level of the data to be transmitted, and a power level of the data to be retransmitted.

13. The method of claim 10, wherein the step of transmitting data having a frame size over a signaling interface comprises: packetizing the data into data packets.

14. The method of claim 13, wherein the data packets support at least one of a wireless downlink data service and a wireless uplink data service.

15. The method of claim 10, wherein the link comprises a wireless link between the base station and a mobile station and the signaling interface is for communication between the base station and a the network controller.

16. The method of claim 10, comprising retransmitting the data from the base station over the link.

17. A method of communication using a network controller, the network controller communicating data having a frame size and protocol information to a base station over a signaling interface, the method comprising:
communicating data over the signaling interface from a network controller within a scheduling interval that is used for transmission by the base station over a link that is distinct from the signaling interface, the frame size of the data at most corresponds with the scheduling interval.

18. The method of claim 17, wherein the scheduling interval is at least equal to a time length of the frame size.

19. The method of claim 18, wherein the data comprises data packets.

20. The method of claim 19, wherein the data packets correspond with the data communicated by the network controller.

21. The method of claim 19, wherein the data packets support at least one of a wireless downlink data service and a wireless uplink data service.

22. The method of claim 21, wherein the time length of the frame size is at most 2 milliseconds.

23. The method of claim 22, wherein the scheduling interval is at most 2 milliseconds.

24. The method of claim 17, wherein the link comprises a wireless link between the base station and a mobile station.

25. The method of claim 17, comprising retransmitting the data from the base station over the link.

* * * * *